Oct. 14, 1930.　　　B. F. SCHMIDT　　　1,778,610
BRAKE ACTUATING MECHANISM
Filed June 13, 1928
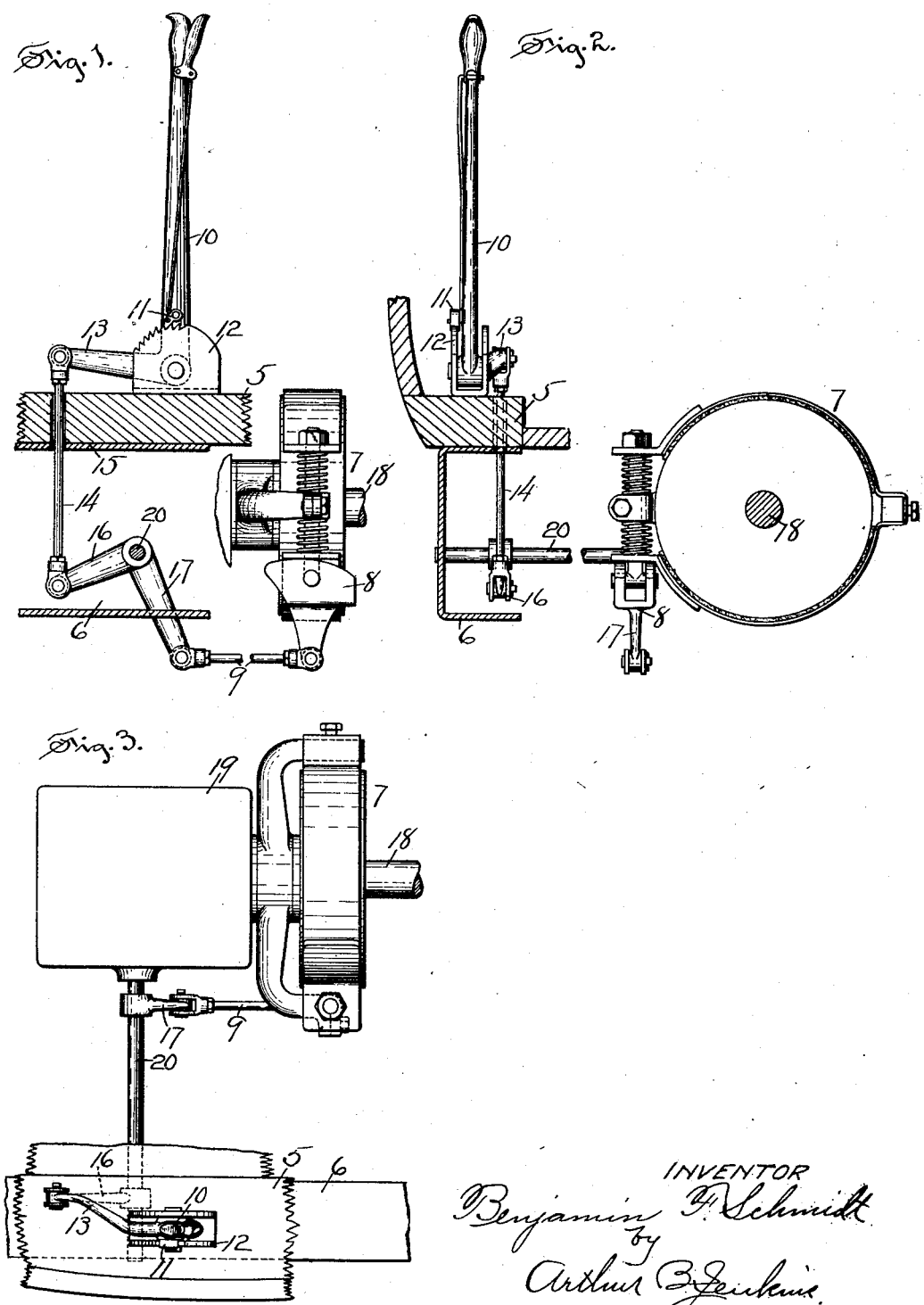
INVENTOR
Benjamin F. Schmidt
by
Arthur B. Jenkins
ATTORNEY Patented Oct. 14, 1930

1,778,610

UNITED STATES PATENT OFFICE

BENJAMIN F. SCHMIDT, OF LOS ANGELES, CALIFORNIA

BRAKE-ACTUATING MECHANISM

Application filed June 13, 1928. Serial No. 284,954.

My invention relates more particularly to the hand operated mechanism commonly employed for operating brakes for automobiles, or other vehicles, and an object of my invention, among others, is the production of a brake that may be constructed and operated in a manner to avoid unnecessarily large openings in the floors of automobile bodies.

One form of mechanism embodying my invention and in the construction and use of which the objects herein set out, as well as others, may be attained, is illustrated in the accompanying drawings, in which—

Figure 1 is a view in side elevation of my improved brake mechanism in place on an automobile, the connecting rod being broken away to enable economizing of space by locating the brake and actuating mechanism therefor close together.

Figure 2 is a similar view but looking in a direction at right angles to the point of view of Figure 1.

Figure 3 is a top view.

Brake actuating mechanism for automobiles, as commonly mounted at the present time, embodies a lever handle extending through the floor of the automobile body and movable back and forth through a slot in said floor. This is very objectionable as it not only admits cold drafts within the inclosure of a closed car during periods of low temperature, but it also admits more or less dust and dirt at all times around the feet and legs of the driver. Although this objectionable feature has always been recognized, and for a great many years, all of the automobiles in use at the present time, so far as I am aware, embody this form of brake actuating mechanism. It is the purpose of my present invention, illustrated and described herein, to eliminate this objectionable feature, and while it is impossible to entirely do away with the opening in the floor my improved construction enables such hole to be reduced to a minimum size.

This mechanism as herein shown comprises a connection extending through a sill 5 of the floor of an automobile body supported upon a frame or chassis 6. A brake mechanism 7, of any ordinary construction and including a brake lever 8, may be supported in any desired location with a connecting rod 9 attached to said lever and extending to my improved brake actuating mechanism. In the structure as herein shown the brake is applied to the driving shaft 18 extending from the motor and in front of the gear casing 19, as in a common form of construction.

A handle lever 10 is pivotally attached to the floor in an ordinary manner and has the usual releasing and holding pawl 11 operating in connection with a rack on a bracket 12 secured to the floor of the car and having the lever 10 mounted thereon as a means for attaching the latter to said floor.

My improved device comprises an actuating arm 13 projecting substantially horizontally from the lever 10, the end of this arm being connected by a rod 14 extending through a hole 15 in the sill 5 with one arm 16 of a bell crank lever pivotally mounted on the frame member 6. This arm 16 is also arranged in a more or less horizontal position and the arm 17 of the bell crank lever is pivotally attached to the connecting rod 9. In the structure herein shown this bell crank lever comprises a shaft 20 rotatably mounted in oppositely positioned sides 6 of the frame and having the arms 16 and 17 secured thereto in spaced relation.

The arms 13 and 16 are arranged that near to a horizontal position as will result in the least lateral movement of the rod 14. These arms are also relatively slightly transversely arranged so that as the rod 14 is moved laterally in one direction by one of the arms it will be moved laterally in another direction by the other of the arms, such slight lateral movement of the rod effected by one of the arms being thus neutralized and lessened by the contrary action of the other rod.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A brake actuating mechanism including a handle pivotally supported on the floor of a vehicle, a brake lever arm extending substantially at right angles from said handle, a shaft mounted beneath said floor and including a brake actuating arm extending more or less in a horizontal position and in the same direction as the brake lever arm with the ends of the brake lever arm and brake actuating arm disposed in the same vertical plane, a vertical link rod connecting the ends of the brake lever arm and the brake actuating arm, and another arm secured to said shaft, and a brake mechanism operatively connected with said last named arm.

2. A brake actuating mechanism including a handle pivotally supported on the floor of a vehicle, a brake lever arm extending at an angle from said handle, a shaft mounted beneath said floor and including a brake actuating arm, a link rod connecting the ends of said arms, another arm secured to said shaft, and a brake mechanism operatively connected with the last mentioned arm, said first mentioned arms being arranged to swing in arcs in opposite directions, whereby the opposite ends of said link rod will be simultaneously moved in opposite directions.

BENJAMIN F. SCHMIDT.